Dec. 17, 1929.　　　　E. H. PITNEY　　　　1,740,314
COMBINATION FLASH LIGHT AND TELESCOPE
Filed Feb. 16, 1928
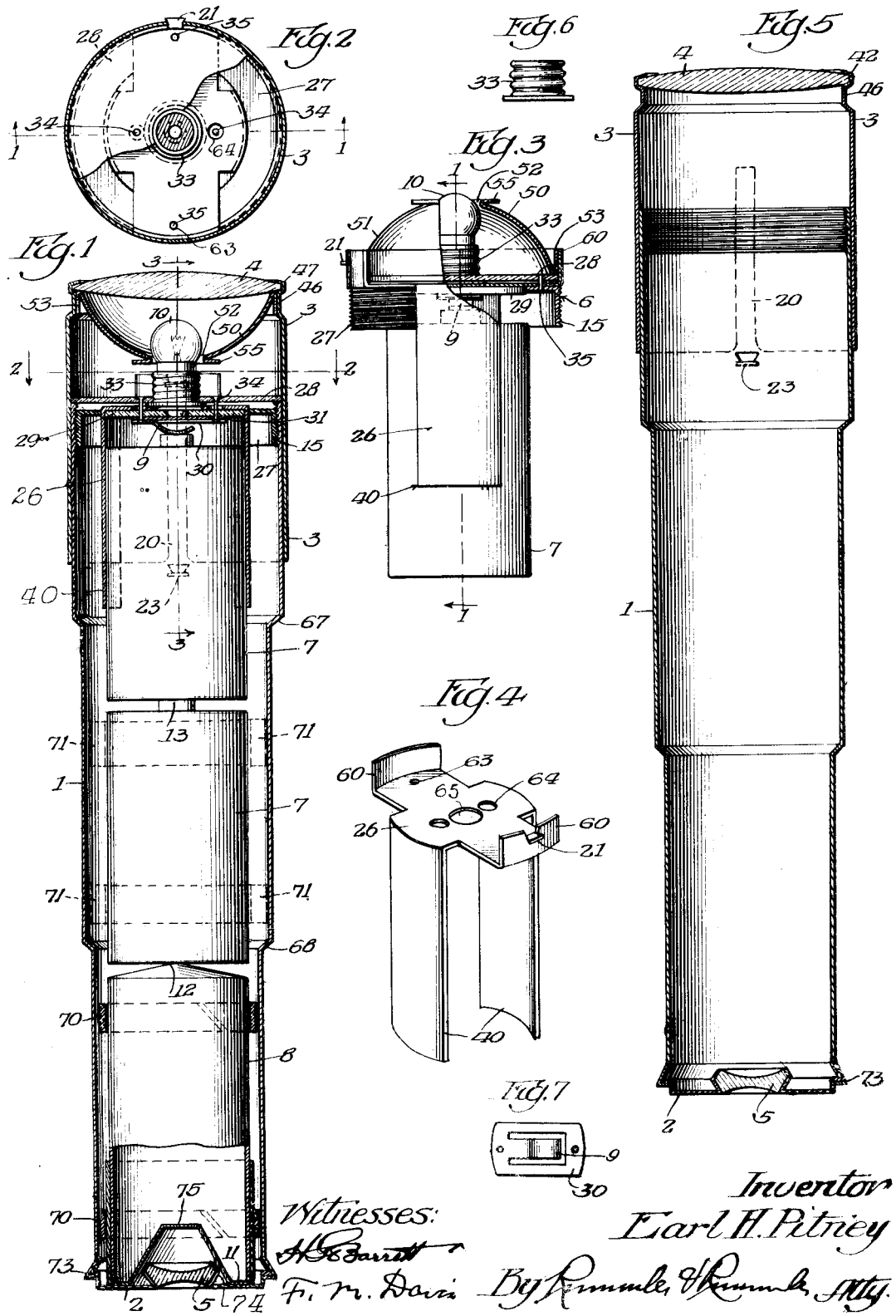
Inventor
Earl H. Pitney Patented Dec. 17, 1929

1,740,314

UNITED STATES PATENT OFFICE

EARL H. PITNEY, OF CHICAGO, ILLINOIS

COMBINATION FLASH LIGHT AND TELESCOPE

Application filed February 16, 1928. Serial No. 254,737.

This invention relates to convertible appliances and more especially to a pocket utensil or instrument adapted for multifarious uses, according to adjustment.

The main objects of the invention are to provide a combination specialty device or instrument of the character referred to, adapted for appropriate alternate adjustment to supply flash light and telescope facilities in a single unit; to provide such a device constructed in a manner to accommodate and house a flash light bulb and a battery therefor and also to include a storage compartment or container, preferably in removable cartridge-like form to hold any desirable accessories, as for instance matches, small tools or other conveniences; to provide improved means for switching the light on and off; to provide improved locking means for the switch; to provide such a device in which a common lens may serve alternatively either for directing the rays from a lamp contained in the device or for visual magnifying purposes when the device is used as a telescope; to provide improved focusing means applicable to both the lighting and telescopic uses of the device; to provide an improved form of lamp holder; to provide for producing a "candle" effect for local general lighting whenever desired; and to provide also in such a device a protected eye piece lens, for telescopic purposes, at the opposite end from the flash light lens.

An illustrative embodiment of this invention is shown by the accompanying drawings in which:

Figure 1 is mainly a longitudinal axial section through the device assembled for use as a flash light, the switch being closed and the light being "on."

Fig. 2 is a cross section substantially on the irregular line 2—2 of Fig. 1.

Fig. 3 is mainly a side elevation of the removable holder for the lamp and adjacent cell of dry battery, the upper right hand corner being in section on the line 3—3 of Fig. 1, and one cell of battery being shown.

Fig. 4 is a perspective view of the frame part of the holder shown in Fig. 3.

Fig. 5 is a longitudinal axial section through the shell, head and lenses of the device taken substantially as in Fig. 1 but with the contents omitted.

Fig. 6 is a side view of the lamp socket.

Fig. 7 is a plan of the combined shock absorber and contact plate.

In the construction shown in the drawings, the device as a whole comprises mainly an elongated and substantially cylindrical shell 1 having a rear end closure part 2 permanently secured thereto, a removable front head 3 also of cylindrical shape, a large lens 4 fixed in the outer end of said head to serve both in flash light and telescopic use of the device and an eye piece lens 5 set in the rear end part 2, together with certain interior parts now to be described.

When the device is to be used as a flash light, a removable frame or holder 6 is mounted in the larger end of shell 1, adjacent to head 3 and lens 4, together with a pair of dry cells 7 disposed backwardly toward the rear end, and with a removable container 8 at the extreme rear end. Briefly, the electrical circuit extends from the central pole cap or positive terminal of the upper cell 7 to a cushioning spring part 9 of holder 6 hereinafter described, and to the middle contact of the lamp 10, through the lamp filament to the sleeve of the lamp, and to the metal frame of holder 6, from whence the circuit continues through the shell 1 to the rear end wall 2, where contact is made with the rear end or cover 11 of the metal container 8. The conical forward tip part 12 of this container contacts with the zinc or negative wall part of the rearward cell 7 which is in series connection at 13 with the similar forward cell, as will be understood.

The lamp circuit is controlled by the switching means now to be described. The holder 6 is threaded exteriorly at 15 to engage the interiorly threaded forward end of shell 1. Hence, the circuit being closed as here shown, it is opened by turning the holder 6 to the left or counter-clockwise, as viewed from the front end, relative to shell 1. The resultant virtual elongation of the cell chamber causes separation of contact at any one or more of four places, namely the points indicated at 9, 11, 12 and 13.

In order to make clear how the holder 6 is turned, the structure will now be more fully described. The head 3 has a longitudinal slot 20 extending from its rear edge about two-thirds of its length. The function of this slot is dual. First, it enables sliding co-turning engagement of the head 3 with the holder 6 by coaction with the outstanding lug 21 on said holder; and second it enables locking of the head 3 against rotation when turned to register with and is pushed inward sufficiently to receive the outstanding lug 23 struck out on shell 1. These two switching functions of head 3 do not interfere with its third function, namely, focusing, as the said lugs do not limit longitudinal sliding movement of head 3, except that the forward lug 21, on holder 6, limits inward movement of the head and so protects the lamp 10 against contact with lens 4 and consequent likelihood of breakage. Flange 55 also serves as a stop.

When the "switch" or holder 6 is turned to the "off" position, the head cap 3 is thrust fully "in" so that the lug 23 engages slot 20 to prevent rotation of holder 6, and so locks the "switch" open. At this time the lug 21 contacts against the inner end of slot 20 and limits inward movement of head 3 sufficiently to protect the lamp.

When the holder 6 is to be turned to its "on" position, as in Fig. 1, the head 3 is pulled out enough to disengage from lug 23. Then as soon as the switch is turned "on" the head 3 may be moved in or out to get the desired focusing of the light beam.

The holder 6 will now be described more in detail. It comprises mainly a metal frame 26, a metallic cylindrical sleeve or cup member 27, on the outside of which the threads 15 are formed, a fiber top plate 28, a flat fiber insulator 29, a metal plate 30 having the yielding contact arm 9 struck up thereon, a contact strip 31 overlying plate 30 to receive the middle contact of the lamp, and a flanged metal socket 33 to receive the base of lamp 10, said parts being clamped together permanently in rigid relation by the rivets 34 and 35. The inner rivets 34 are insulated from member 26 owing to the extra large holes therefor in said member. The outer rivets 35 serve solely to secure the members 26 and 27 to the plate 28. The frame 26 has arcuate longitudinal arms 40 spaced to embrace and center the adjacent cell 7. The plate 28 overlaps the edge of ring 27 and serves as a stop to limit inward movement of holder 6 by coming to rest against the outer end of shell 1, as in Fig. 1.

The cap or head 3 is inwardly ribbed at its outer end, as at 46, and is spun over to securely engage the edge of lens 4 as at 47. The reflector 50 is removably mounted in the head 3. It comprises a concave part 51, centrally apertured at 52, to admit the lamp 10 and has an outer cylindrical flange 53 to fit snugly in the neck 46 of head 3. An outwardly turned flange 55 is provided on its inner edge to serve as a handle means to facilitate removal. The inner diameter of neck 46 is the same as the inner diameter across holder 6 between its upstanding arms 60, so that the deflector 50 may be applied upside down as in Fig. 3 to protect the lamp when the holder 6 is removed.

It may be noted that the lug 21 is struck out on one of the arms 60. The flat body part of holder 6 has small outer holes 63 for the rivets 35 and large inner holes 64 for rivets 34. The hole 65 accommodates the base of lamp 10.

The shell is stepped conoidally at 67 and 68 to simulate the appearance of a telescope. In order to center the rearward cell 7 and the adjacent container 8 and to positively insulate the same from the shell appropriate insulation rings 70 and 71 are provided, the latter being shown dotted as they may be omitted if the cell is covered with insulation and if it centers sufficiently of itself.

The shell wall 2 has its edges spun into permanent rigid supporting engagement as at 73 and its inner edges are spun around the edge of lens 5 to secure the same at 74. The cover 11 of container 8 is recessed at 75 to accommodate and shield lens 5.

Some of the main features of novelty and advantage in the above described device are the screw actuated ring switch for controlling the lamp circuit, as at the lamp base or any other point of series contact effected by the longitudinal movement of the switch ring; the arms on the switching ring to grasp and center adjacent battery cell; the reversible reflector adapted to fit, when desired, into the forwardly projecting arms on the switch ring to protect the bulb; the provision for removing the battery and container from the front end of the main shell member; the diverse switching and focusing function of the slidably removable cap or head piece; the friction attachment of the reflector in its alternative positions, whereby it is easily adjusted according to the desired use; and the easily removable character of the ring switch and the other members held in place thereby.

Furthermore, the device is adaptable for "candle-light" use simply by removing the head 3 and with it the reflector 50; the "switch" is entirely concealed and hence protected from injury and accidental actuation; the part 11 serves both as a lid for the container and as an inward shield for the lens 5.

I would also have it understood that although the end cap 2 is shown as fixed in place, instead of being in screw-cap form as usual in flash lights, still I do not regard my invention as limited thereto.

The particular form and arrangement of lenses 4 and 5, shown in Figs. 1 and 5, accommodate telescopic use of the device under the principles of the simplest of all telescopes, namely, Galileo's, for it only consists of two lenses, namely, an object glass 4 and a diverging or double concave eyepiece 5, and it gives at once an erect image, such as provided for by opera glasses.

Although but one specific embodiment of this invention is herein shown and described, it is to be understood that numerous details of the construction shown may be altered or omitted without departing from the spirit of this invention as defined by the following claims:

I claim:

1. A combination flashlight and telescope of readily convertible character for alternative corresponding uses, which device comprises a telescopically extensible shell including mutually detachable sections provided with lenses respectively adapted mutually and spaced widely apart for telescopic use, in combination with a removable lamp, battery and switching means adapted and arranged to direct light rays through one of said lenses for flashlight use, the switching means comprising a holder for said lamp having threaded engagement with one of said sections for axial adjustment to open and close the circuit and having coturning engagement with the other section, whereby the circuit may be controlled by relative turning of said sections.

2. A combination multiple use device of the character described, comprising an elongated and adjustably extensible tubular shell having a large lens at one end and a small lens at the other end, in combination with a lamp and a battery adjacent to the larger lens for flashlight use and a container for handy accessories adjacent to the small lens, said lamp, battery and container being removable whereby the device is adaptable for use as a telescope.

3. In a convertible device of the character described, a telescopically extensible tubular shell including a pair of longitudinally adjustable sections each having one of a pair of telescopically related lenses in its outer end, in combination with a combined lamp holder and switching means having threaded engagement with one of said sections, and an end-contact battery in the same section with said means, the other section having endwise sliding coturning engagement with said means for operating the latter and the battery holding section having means to arrest rotation of the other section when they are occluded sufficiently, and said battery and means being removable for converting said device to telescopic use.

4. A device of the character described comprising a pair of telescopically related shell members, one serving as a body and the other as a head, a holder screw-mounted in said body, a lamp mounted on said holder, a battery in said body, a lens in said head, the circuit for said lamp being controlled by turning said holder in said body, said head being lengthwise slidably engaged with said holder for turning the latter and said head being removable to produce a candle light effect.

5. A combination flashlight and telescope of readily convertible character for alternative corresponding uses, which device comprises an elongated extensible tubular shell having mutually related lenses set in its ends respectively adapted for telescopic use, in combination with removable accessory means including a lamp and a battery adapted for arrangement in circuit with each other and with said shell, and in appropriate relation to one of said lenses for flashlight purposes, one section of said shell having said one lens being removable to accommodate a candle light effect.

6. In a convertible device of the character described, a removable part comprising a reflector and a lamp and a holder therefor having forward arms to embrace the reflector in its inverted position to protect said lamp, and rearward arms to hold and center a battery cell.

7. In a convertible device of the character described, a removable part comprising a reflector and a lamp and a holder therefor having forward arms to embrace the reflector in its inverted position to protect said lamp, and rearward arms to hold and center a battery cell, said holder having a yielding contact and connections therefor to provide a circuit from the battery to the lamp.

8. A telescope of the Galileo type, in combination with removable light generating means mounted therein, said telescope having an extensible shell comprising an eye-piece section and an object-lens section, the eyepiece section being formed and adapted to hold said light generating means rigidly therein for projecting its light forward through the other section.

Signed at Chicago this 14th day of February, 1928.

EARL H. PITNEY.